United States Patent

[11] 3,602,231

[72] Inventor Mortimer Russell Dock
 New York, N.Y.
[21] Appl. No. 884,542
[22] Filed Dec. 12, 1969
[45] Patented Aug. 31, 1971
[73] Assignee The H-2-D Filter Corporation
 New York, N.Y.

[54] MEANS FOR AUDIBLE DETECTION OF THE ACTIVATION OF A FILTER FOR SMOKING DEVICES
 1 Claim, 5 Drawing Figs.

[52] U.S. Cl. .................................................. 131/10.1,
 131/261 A, 131/265, 131/267
[51] Int. Cl. ................................................. A24d 01/04,
 A24f 25/02
[50] Field of Search ............................................ 131/10.1,
 10.3, 10 R, 261 R, 261 A

[56] References Cited
UNITED STATES PATENTS

| 2,597,011 | 5/1952 | MacMasters et al. | 131/261 R U |
| 3,366,121 | 1/1968 | Carty | 131/10.1 |
| 3,390,687 | 7/1968 | Lynn | 131/261 R X |
| 3,428,049 | 2/1969 | Leake et al. | 131/10.1 |
| 3,502,084 | 3/1970 | Carty | 131/10.1 |

Primary Examiner—Samuel Koren
Assistant Examiner—G. M. Yahwak
Attorney—Peter M. Boesen ABSTRACT: The present invention provides means for creating audible evidence of the activation of a filter by the rupture of crisp or brittle material included in a filter having rupturable fluid-containing bodies therein.

PATENTED AUG 31 1971 3,602,231

INVENTOR.
MORTIMER RUSSELL DOCK
BY Peter M. Bresen

ATTORNEY

MEANS FOR AUDIBLE DETECTION OF THE ACTIVATION OF A FILTER FOR SMOKING DEVICES

It is the purpose of the present invention to provide audible evidence of the rupture of fluid-containing bodies in a filter for smoking devices such as cigarettes, breakage of one or more crisp or brittle members encased in the filter housing together with such fluid-containing bodies, whose contents are released upon the rupture thereof and are quickly absorbed into adjacent spongelike material. Such crisp or brittle means may be of cereal composition such as the emphatically crisp processed cereals; which produce sound when broken or said means may be provided by other materials, edible or inedible, having similar characteristics of crispness or brittleness and being likewise capable of producing sound upon the breakage thereof. Said fluid-bearing capsules having frangible shells may when broken produce sufficient sound to be audible. When such capsules are used, the addition crisp or brittle means may be omitted.

The said fluid-containing bodies in combination with absorbent material have been previously disclosed in U.S. Pat. No. 3,366,121 and copending application Ser. No. 662,920 now U.S. Pat. No. 3,502,084, relating to the same field of invention, i.e., variations of structures using water-bearing capsules in combination with absorbent, spongelike material, which have been assigned to and are owned in their entirety by the assignee of this present application.

The said or brittle members the breakage of which causes a detectable sound are provided so that the smoker has audible evidence of the activation of the moist filter by the simultaneous rupture of said crisp or brittle members and said fluid-containing bodies, causing the release of fluid from the latter and consequent moistening of the adjacent absorbent material to activate the said moistened filter element.

Such activated is equally effective without audible evidence thereof, but it is believed that smoker interest will be increased by the provision of such crisp or brittle means for creating a crackling or crunching sound when the filter is activated, that is, moistened, by the release of the fluid into the absorbent material forming a part of the filter structure.

For a better understanding of the invention, reference is made to the accompanying drawings, in which FIG. 1 shows a longitudinal cross section of a filter for smoking articles such as cigarettes, wherein rupturable fluid-bearing capsules are disposed adjacent absorbent material, and crisp or brittle members are included in random arrangement, within a resilient tubular housing;

Figure 1:
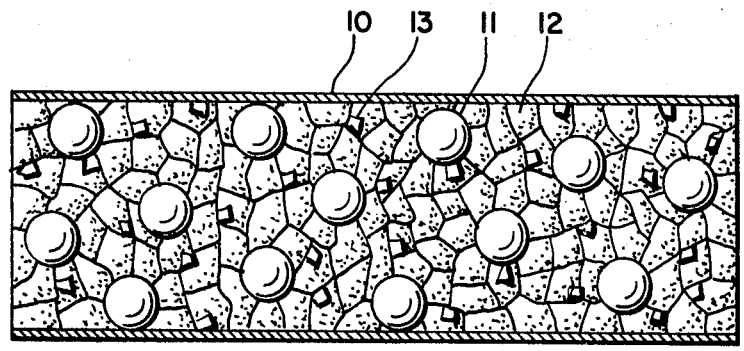

Referring more particularly to the drawings,

In FIG. 1, housing 10 encloses rupturable fluid-bearing capsules 11 and absorbent material 12, and crisp or brittle members 13 the breakage of which creates an audible sound.

Figure 2:
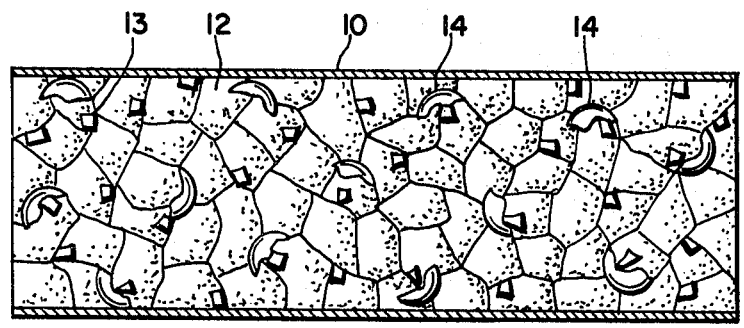
FIG. 2 shows the view of FIG. 1 after the simultaneous rupture of said capsules and said crisp or brittle members, by compression exerted laterally or longitudinally upon the housing.

In FIG. 2, the absorbent material 12, moistened by the fluid released from the ruptured capsules, particles of which appear as 14, has expanded and substantially fills the space previously occupied by the capsules. The crisp or brittle members 13, having been audibly broken, are intermixed with the absorbent material and substantially indistinguishable therefrom.

Figures 3, 4, 5:
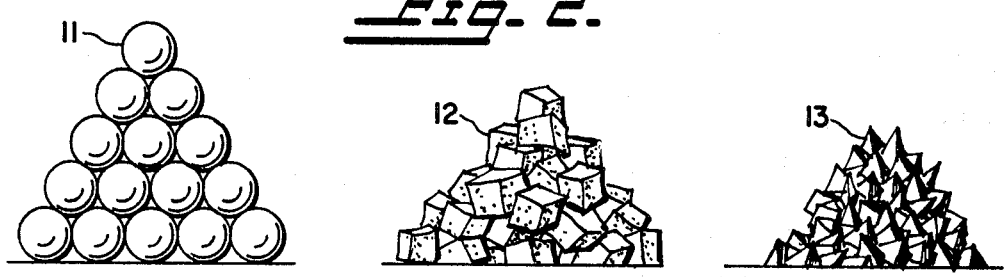
FIG. 3 shows a quantity of fluid-bearing capsules.
FIG. 4 shows absorbent material in the form of finely divided particles.
FIG. 5 shows sound-producing members having pronounced crispness.

The elements of the filter device, in their form prior to rupture, comprise
the capsules 11, shown in FIG. 3;
absorbent material 12, shown in FIG. 4; and
crisp or brittle means 13, shown in FIG. 5.

The breakage of the crisp means and the fluid-bearing capsules is effected by compression exerted upon the body of the filter, either laterally or longitudinally as provided in the patents mentioned above. Following such breakage the pieces of the crisp or brittle means become moistened as the fluid escapes from the rupturable bodies and is absorbed into the adjacent spongelike material and into the particles of such crisp or brittle means.

The invention having been thus disclosed, what is claimed is:

1. in a filter for smoking articles comprising a resilient tubular member and disposed therein at least one rupturable hollow body having a fluid content and adjacent thereto, absorbent material capable of receiving the fluid content upon the release from the said hollow body, the improvement of means enclosed in said tubular member for providing audible evidence of the rupture of said hollow body by the simultaneous breakage of said means and said rupturable hollow body, said means for providing audible evidence consisting of processed cereals having the property of creating sound when broken.